United States Patent
Klots et al.

(10) Patent No.: US 6,363,396 B1
(45) Date of Patent: Mar. 26, 2002

(54) OBJECT HASHING WITH INCREMENTAL CHANGES

(75) Inventors: Boris Klots, Belmont; Roger J. Bamford; Jeffrey Fischer, both of San Francisco; Ravi Mirchandaney, Menlo Park, all of CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/218,864

(22) Filed: Dec. 21, 1998

(51) Int. Cl.$^7$ .............................................. G06F 17/00
(52) U.S. Cl. ................................ 707/103 Y; 707/102
(58) Field of Search .......................... 707/1, 200, 202, 707/102, 103; 709/104, 203

(56) References Cited

U.S. PATENT DOCUMENTS

| | | | |
|---|---|---|---|
| 5,060,144 A | 10/1991 | Sipple et al. | 710/200 |
| 5,161,227 A | 11/1992 | Dias et al. | 709/104 |
| 5,202,971 A | 4/1993 | Henson et al. | 707/8 |
| 5,287,521 A | 2/1994 | Nitta et al. | 710/200 |
| 5,403,639 A | 4/1995 | Belsan et al. | 707/204 |
| 5,408,653 A | 4/1995 | Josten et al. | 707/8 |
| 5,452,447 A | 9/1995 | Nelson et al. | 707/205 |

(List continued on next page.)

OTHER PUBLICATIONS

Mirchandaney, R., "Improving the Proformance of DSM Systems Via Complier Involvement," Supercomputing '94, Proceedings, pp. 763–772.*

Hauptmann S., Wasel J.: "On–Line Maintenance with On–the–Fly Software Replacement," Proceedings of the Third International Conference on Configurable Distributed Systems, Annapolis, MD. May 6–8, 1996, IEEE Computer Society Press, Los Alamitos, CA, p. 70–80, XP002134719.

Loomis, Mary E.S., ODBMS, "Object Locking", Mar./Apr. 1992, pp 53–56.

Apple Computer, Inc., Apple Press, "OpenDoc Cookbook for the Mac OS", 1996, pp 187–189.

Aldred, M., Gertner, I., McKellar, S., Encore Comput. Corp., Marlborough, MA, "A Distributed Lock Manager on Fault Tolerant MPP", 1995, pp 134–136.

CORBAservices, "CORBAservices: Common Object Services Specification", Mar. 1995, pp 7–1 to 7–14.

*Primary Examiner*—Thomas Black
*Assistant Examiner*—Charles L. Rones
(74) *Attorney, Agent, or Firm*—Hickman Palermo Truong & Becker LLP; Brian D. Hickman

(57) ABSTRACT

A method and system are provided for reconfiguring a multiple node system after an epoch change in a manner that reduces the overhead and system unavailability typically incurred during reconfiguration. A resource-to-master mapping is established using the combination of a resource-to-bucket hash function and a bucket-to-node hash function. The resource-to-bucket hash function is not changed in response to an epoch change. The bucket-to-node hash function does change in response to epoch changes. Techniques are disclosed for adjusting the dynamic bucket-to-node hash function after an epoch change in a manner that load balances among the new number of nodes in the system. Further, the changes to the bucket-to-node assignments are performed in a way that reduces the number of resources that have to be remastered. In one embodiment, only those resources that lose their masters during an epoch change are assigned new masters during an initial reconfiguration. Load balancing is then gradually achieved by migrating resources after the system has been made available. The old masters of resources forward access requests to new masters of resources once they have transferred the master resource objects for the requested resources. In addition, techniques are disclosed for migrating resources from a node in anticipation of a planned shutdown of the node.

24 Claims, 5 Drawing Sheets

U.S. PATENT DOCUMENTS

| | | | |
|---|---|---|---|
| 5,551,046 A | 8/1996 | Mohan et al. | 707/8 |
| 5,612,865 A | 3/1997 | Dasgupta | 364/184 |
| 5,892,945 A * | 4/1999 | Mirchandaney et al. | 709/104 |
| 5,893,086 A * | 4/1999 | Schmuck et al. | 707/1 |
| 5,963,960 A * | 10/1999 | Swart et al. | 707/202 |
| 5,970,495 A * | 10/1999 | Baru et al. | 707/102 |
| 6,023,706 A * | 2/2000 | Schmuck et al. | 707/200 |
| 6,026,293 A * | 2/2000 | Osborn | 455/411 |
| 6,144,983 A * | 11/2000 | Klots et al. | 709/104 |
| 6,173,313 B1 * | 1/2001 | Klots et al. | 709/203 |
| 6,292,795 B1 * | 9/2001 | Peters et al. | 707/3 |

\* cited by examiner

OBJECT HASHING WITH INCREMENTAL CHANGES

FIELD OF THE INVENTION

The present invention relates to computer systems and, more specifically, to techniques for mastering resources within computer systems.

BACKGROUND OF THE INVENTION

Database servers use resources while executing transactions. Even though resources may be shared between database servers, many resources may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

The entity responsible for granting locks on resources is referred to as a lock manager. In a single node database system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager.

FIG. 1 is a block diagram of a multiple-node computer system 100. Each node has stored therein a database server and a portion of a distributed lock management system 132. Specifically, the illustrated system includes three nodes 102, 112 and 122 on which reside database servers 104, 114 and 124, respectively, and lock manager units 106, 116 and 126, respectively. Database servers 104, 114 and 124 have access to the same database 120. The database 120 resides on a disk 118 that contains multiple blocks of data. Disk 118 generally represents one or more persistent storage devices which may be on any number of machines, including but not limited to the machines that contain nodes 102, 112 and 122.

A communication mechanism allows processes on nodes 102, 112, and 122 to communicate with each other and with the disks that contain portions of database 120. The specific communication mechanism between the nodes and disk 118 will vary based on the nature of system 100. For example, if the nodes 102, 112 and 122 correspond to workstations on a network, the communication mechanism will be different than if the nodes 102, 112 and 122 correspond to clusters of processors and memory within a multiprocessing machine.

Before any of database servers 104, 114 and 124 can access a resource shared with the other database servers, it must obtain the appropriate lock on the resource from the distributed lock management system 132. Such a resource may be, for example, one or more blocks of disk 118 on which data from database 120 is stored.

Lock management system 132 stores data structures that indicate the locks held by database servers 104, 114 and 124 on the resources shared by the database servers. If one database server requests a lock on a resource while another database server has a lock on the resource, the distributed lock management system 132 must determine whether the requested lock is consistent with the granted lock. If the requested lock is not consistent with the granted lock, then the requester must wait until the database server holding the granted lock releases the granted lock.

According to one approach, lock management system 132 maintains one master resource object for every resource managed by lock management system 132, and includes one lock manager unit for each node that contains a database server. The master resource object for a particular resource stores, among other things, an indication of all locks that have been granted on or requested for the particular resource. The master resource object for each resource resides within only one of the lock manager units 106, 116 and 126.

The node on which a lock manager unit resides is referred to as the "master node" (or simply "master") of the resources whose master resource objects are managed by that lock manager unit. Thus, if the master resource object for a resource R1 is managed by lock manager unit 106, then node 102 is the master of resource R1.

In typical systems, a hash function is employed to select the particular node that acts as the master node for a given resource. Specifically, a hash function is applied to the resource name to produce a value. All of the resource names that hash to the same value belong to the same "bucket". Each node is then assigned to be the master for all resources whose names belong to a given bucket.

For example, system 100 includes three nodes, and therefore may employ a 3-bucket hash function that produces the values: 0, 1 and 2. Each bucket is associated with one of the three nodes. The node that will serve as the master for a particular resource in system 100 is determined by applying the hash function to the name of the resource. All resources that have names that hash to the bucket associated with the value 0 are mastered on node 102. All resources that have names that hash to the bucket associated with the value 1 are mastered on node 112. All resources that have names that hash to the bucket associated with the value 2 are mastered on node 122.

When a process on a node wishes to access a resource, a hash function is applied to the name of the resource to determine the master of the resource, and a lock request is sent to the master node for that resource. The lock manager on the master node for the resource controls the allocation and deallocation of locks for the associated resource.

When the master node of a resource grants a lock on the resource to a process running on another node, the other node maintains information about the lock that its process holds on the resource. The lock information that is maintained by non-master nodes that are interested in (i.e. hold a lock on) a resource may be used during recovery in the event that the master node fails. The data structure used by a node that is not the master of a resource to track the locks on the resource that are held by local processes is referred to as a shadow resource object. For every master resource object, up to N-1 shadow resource objects may exist (where N is equal to the number of nodes in the system), since is it possible for processes on all non-master nodes to simultaneously hold non-exclusive locks on the same resource.

Changing the master of a lock resource from one node to another is referred to as "remastering" the lock resource. The process of remastering a resource typically involves reconstructing a master resource object for the resource on a new master. While a resource is being remastered, the resource is generally unavailable.

At any point in time, the responsibility for mastering resources is distributed between a specific set of nodes. When that set of nodes changes, and "epoch change" is said to occur.

A variety of events may make it desirable or necessary to perform remastering operations. For example, when nodes fail or are shut down, then mastery of the resources currently mastered by those nodes must be shifted to other nodes. Similarly, when new nodes are added to the system, it may be desirable to shift mastery of some of the resources to the newly added nodes, thereby more evenly distributing the load associated with resource management among all of the nodes.

When resource name hashing is used to assign resources to nodes, remastering the resources in response to an epoch change typically involves changing the hash function, and then redistributing mastery responsibilities based on the resource-to-master mapping produced by the new hash function. Specifically, when the system consists of N nodes, an N-bucket hash function (a hash function that produces N values) is used to perform the master node assignment. As N changes (due to the addition, removal, or failure of nodes), so must the hash function. After a new hash function for the resource-to-master mapping has been selected, the master resource objects must be moved to their new masters. The new master for any given resource is determined by applying the new hash function to the name of the resource.

Unfortunately, the remastering that occurs in response to the adoption of a new hash function can potentially involve remastering every resource in the system. Consequently, the entire system may effectively be rendered unavailable until the remastering is completed. This is true even if the change in the system configuration is relatively small. For example, if a fifty first node is added to a fifty node system, it is possible that all resources in the system will be assigned new masters by the new hash function selected to load balance between the fifty-one nodes. A similarly drastic remastering operation may result when one node on a fifty nodes fails.

Based on the foregoing, it is clearly desirable to provide a remastering technique that reduces the remastering overhead associated with an epoch change in a multiple node system. It is further desirable to provide a remastering technique that allows a relatively balanced load distribution to be maintained after epoch changes, both as new nodes are added to the system and as nodes are removed from the system. It is also desirable to provide a remastering technique that does not effectively render the entire system unavailable for the duration of the remastering operation.

SUMMARY OF THE INVENTION

A method and system are provided for reconfiguring a multiple node system after an epoch change in a manner that reduces the overhead and system unavailability typically incurred during reconfiguration. According to one aspect of the invention, a resource-to-master mapping is established using the combination of a resource-to-bucket hash function and a bucket-to-node hash function.

According to one aspect of the invention, the resource-to-bucket hash function is not changed in response to an epoch change, while the bucket-to-node hash function does change in response to epoch changes. Consequently, the resource-to-bucket hash function is "static", while the bucket-to-node hash function is "dynamic".

Preferably, the dynamic bucket-to-node hash function is adjusted after an epoch change in a manner that load balances among the new number of nodes in the system. Further, the changes to the bucket-to-node assignments are performed in a way that minimizes the number of resources that have to be remastered.

According to another aspect of the invention, only those resources that lose their masters during an epoch change are assigned new masters during the initial reconfiguration. Load balancing is then gradually achieved by migrating resources after the system has been made available. The old masters of resources forward access requests to new masters of resources once they have transferred the master resource objects for the requested resources. In addition, techniques are disclosed for migrating resources from a node in anticipation of a planned shutdown of the node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing resources in a multiple-node system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
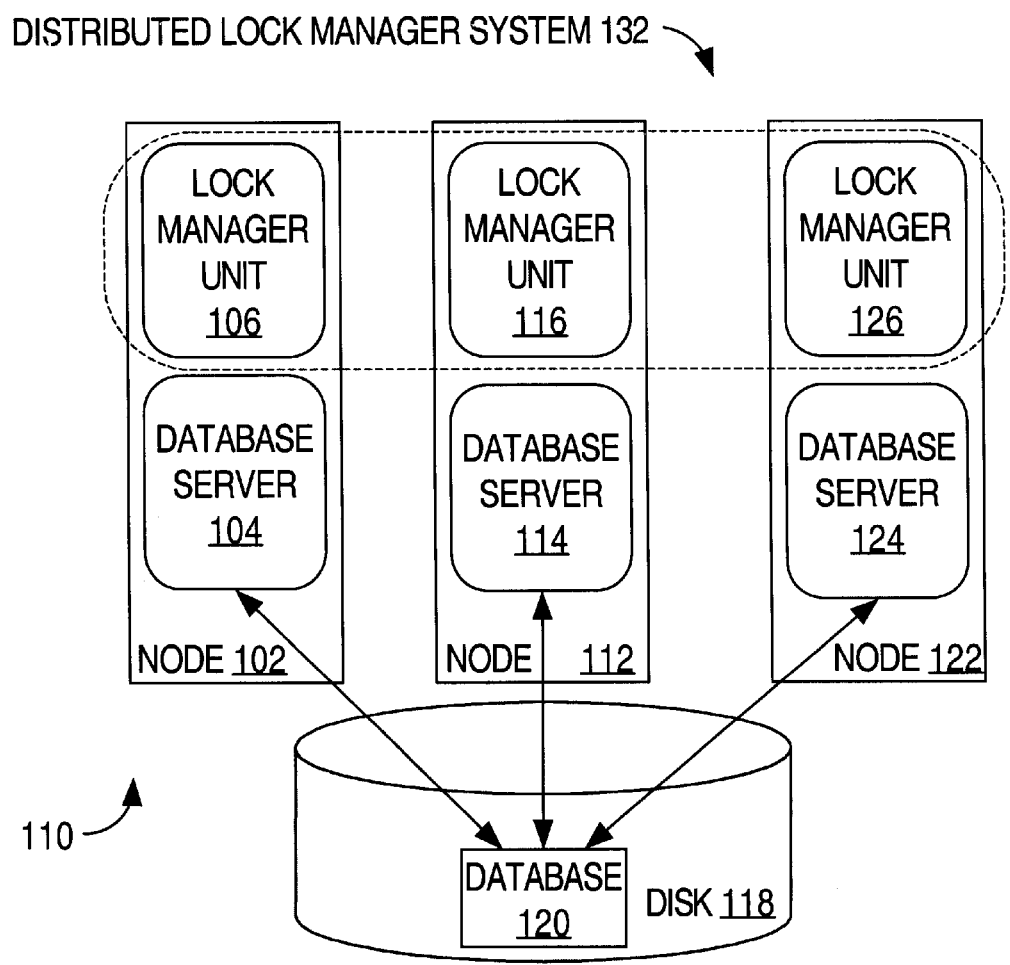
FIG. 1 is a block diagram of a multiple-node system having a distributed lock manager.
Figure 2:
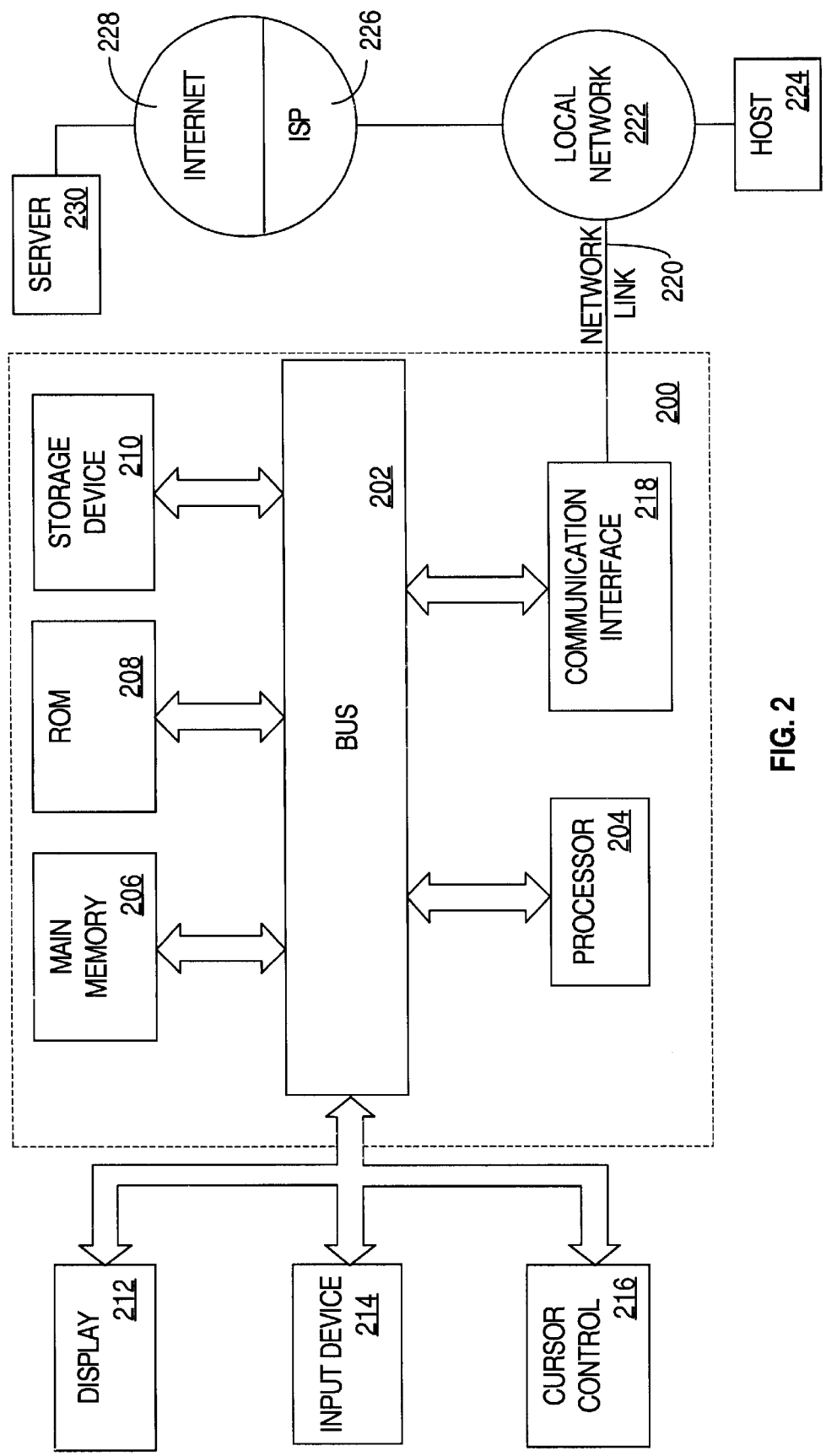
FIG. 2 is a block diagram of a computer system on which an embodiment for the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for managing resources in a multiple node system. According to one embodiment of the invention, resource management is provided by computer system 200 in response to processor 204 executing one or more sequences of one or more instructions contained in main memory 206. Such instructions may be read into main memory 206 from another computer readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Functional Overview

Techniques are described herein for establishing a resource-to-master mapping for L number of resources in an N-node system using an M-bucket hash function, where M is greater than N but less than L. In practice, L may be three to four orders of magnitude greater than M, while M is one or two orders of magnitude greater than N. For example, a 1000-bucket hash function may be used to establish a resource-to-bucket mapping for a million resources in a six-node system. Because the number of buckets exceeds the number of nodes, each node is assigned one or more buckets using a second, bucket-to node hash function.

According to one aspect of the invention, the hash function used to map resources to hash buckets is not changed in response to an epoch change. Unlike the name-to-bucket hash function, the bucket-to-node hash function does change in response to epoch changes. Consequently, the resource-to-bucket hash function is "static", while the bucket-to-node hash function is "dynamic".

Preferably, the dynamic bucket-to-node hash function is adjusted after an epoch change in a manner that load balances among the new number of nodes in the system. Preferably, the changes to the bucket-to-node assignments are performed in a way that minimizes the number of resources that have to be remastered.

According to one embodiment, the bucket-to-node hashing is performed using bucket-range-to-node mapping information, which is maintained to indicate which bucket ranges correspond to which nodes. In response to epoch changes, the bucket-range-to-node mapping information is revised based on a set of remapping rules. The remapping rules attempt to both evenly distribute the load, and to minimize the number of resources that have to be remastered.

Because the number of buckets is smaller than the number of resources, and the number of bucket ranges is smaller than the number of buckets, the bucket-range-to-node mapping information will typically be significantly smaller than the amount of information that would be required if resources were mapped to nodes on an individual basis.

Exemplary System

Figure 3:
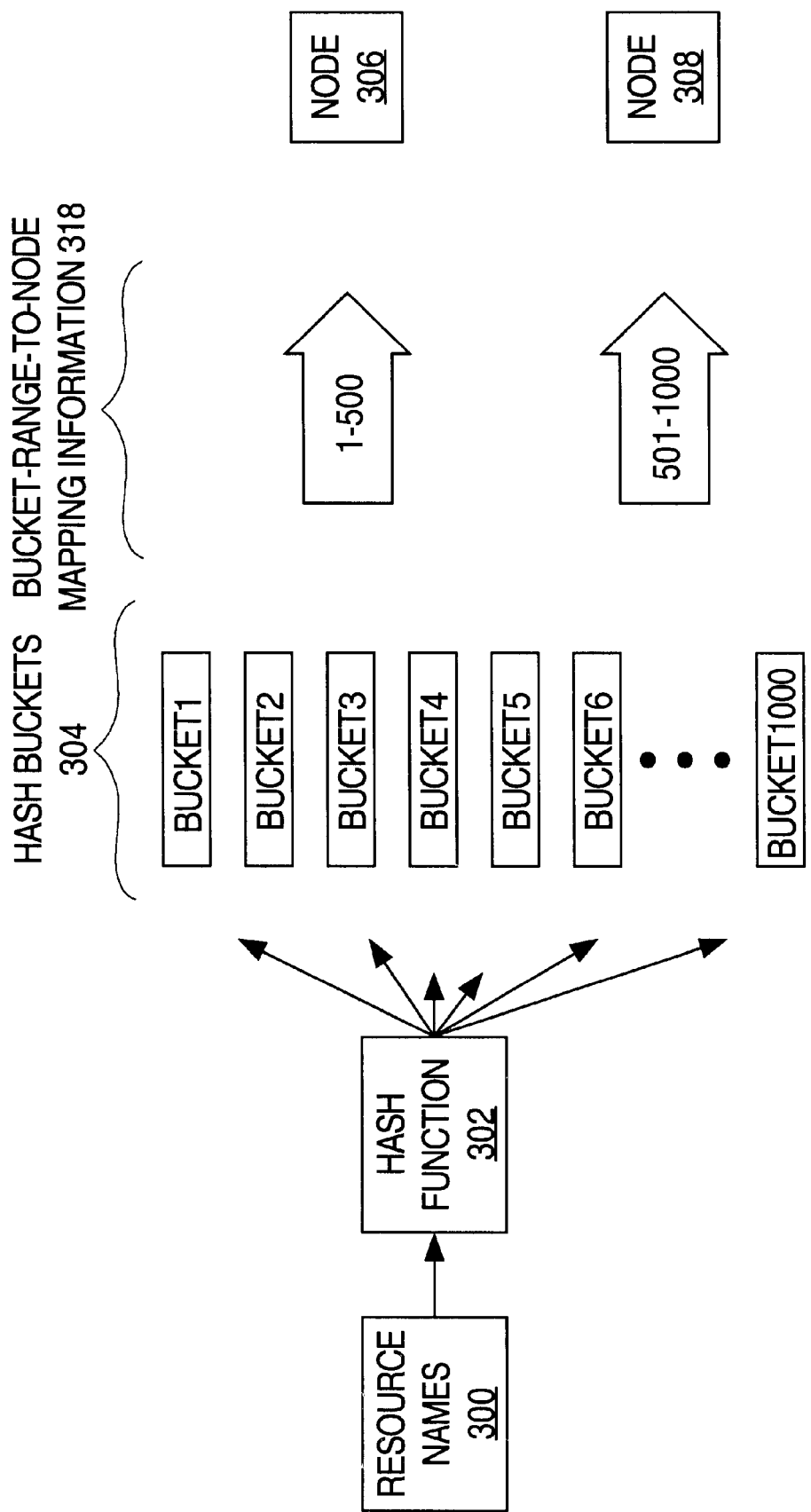
FIG. 3 is a block diagram illustrating a system that employs an embodiment of the invention to determine where to master resources in a multiple node system.

Referring to FIG. 3, it is a block diagram illustrating a multiple-node system that maps bucket ranges to nodes according to an embodiment of the invention. The system uses a hash function 302 to map resource names 300 to 1000 hash buckets 304. The system maintains bucket-range-to-node mapping information 318 to indicate which hash buckets correspond to which nodes. This bucket-range-to-node mapping information 318 operates as a second hash function, mapping a relatively large number of buckets to a smaller number of nodes. When a bucket is mapped to a node, resources that have resource names that hash to that bucket are mastered at that node.

In the embodiment illustrated in FIG. 3, there are two nodes 306 and 308. Bucket range 1–500 is mapped to node 306, and bucket range 501–1000 is mapped to node 308. Consequently, node 306 is the master of all resources whose names hash to buckets 1–500, and node 308 is the master of all resources whose names hash to buckets 501–1000.

Figure 4:
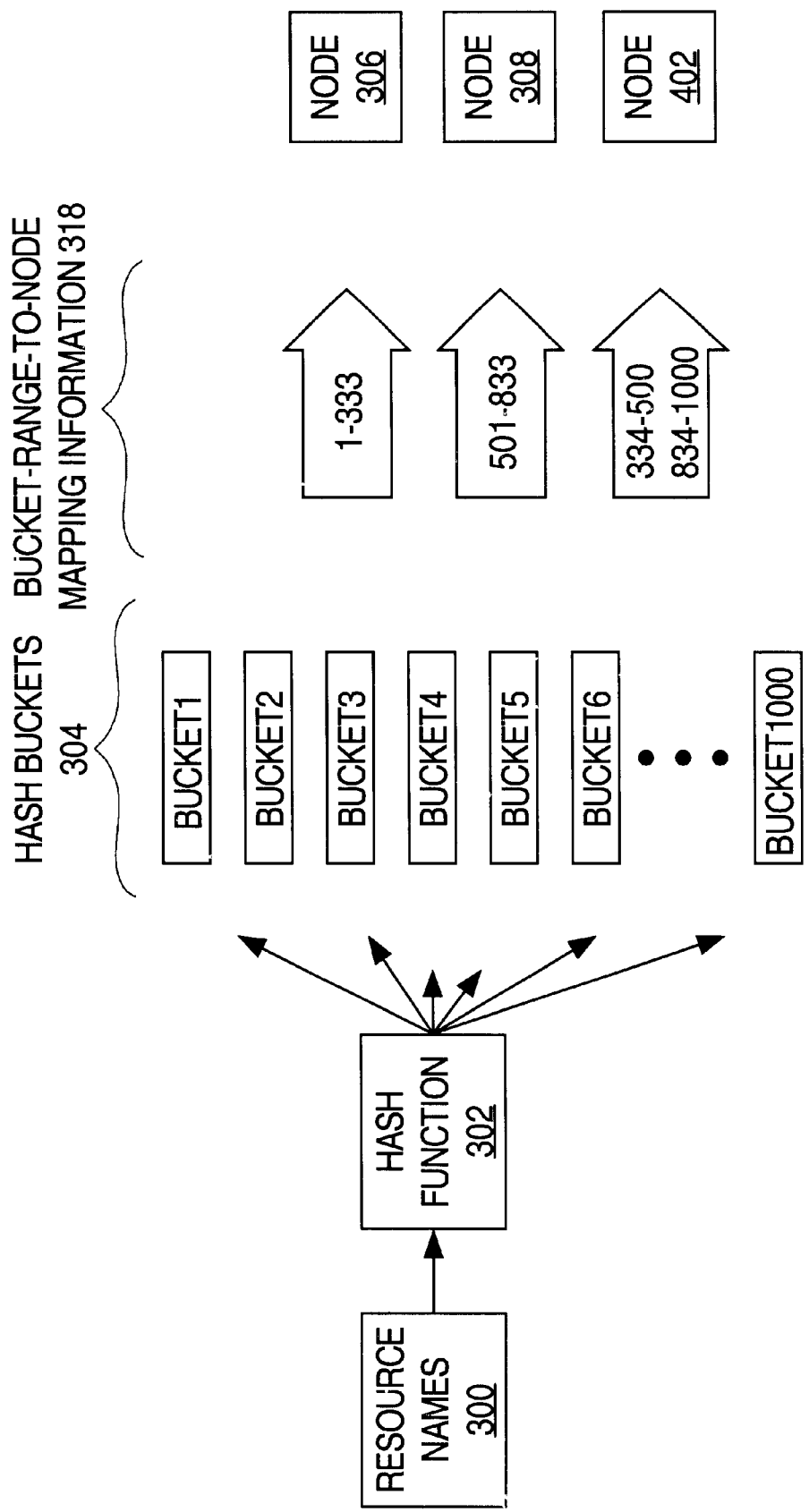
FIG. 4 is a block diagram of the system shown in FIG. 3 after an epoch change.

FIG. 4 is a block diagram illustrating the system shown in FIG. 3 after an epoch change has occurred. In this example, the epoch change resulted because a new node 402 was introduced to the system, increasing the number of nodes to three. No change was made to the resource-to-bucket hash function 302 in response to the epoch change. Consequently, the number of hash buckets remains the same, and all of the resource names continue to hash to the same buckets.

However, to more evenly distribute the resource mastering responsibilities among the three nodes, revisions are made to the bucket-range-to-node mapping information 318. Specifically, the bucket range mapped to node 306 is changed from 1–500 to 1–333. Similarly, the bucket range mapped to node 308 is changed from 501–1000 to 501–833. The remaining bucket ranges (334–500 and 834–1000) are then mapped to the new node 402.

All of the resources whose names hash to the buckets that are mapped to the new node 402 have to be remastered at the new node. However, unlike prior remastering techniques, the resources that not mapped to the newly introduced node generally remain mastered at their current masters. In the present example, all of the resources that hash to buckets 1–333 remained mastered at node 306, and all of the resources that hash to buckets 501–833 remained mastered at node 308. Consequently, none of the overhead associated with remastering is incurred for those resources. Further, because those resources are not remastered, those resources do not experience the period of unavailability associated with remastering a resource.

Bucket-Range-To-Node Mapping Adjustments

As illustrated above, the bucket-range-to-node mapping is adjusted in response to epoch changes in a way that attempts to both (1) evenly distribute the mastering burden among the new set of nodes, and (2) reduce the number of resources that are remastered. Various mapping adjustment techniques may be used to achieve these goals. In the following discussion, specific techniques shall be described in detail. However, the present invention is not limited to any particular mapping adjustment technique.

According to one embodiment of the invention, the mapping adjustment technique used by the system is deterministic. Thus, given any specific initial bucket-to-node mapping and any specific system configuration change, the mapping adjustment rules will produce a single revised bucket-to-node mapping. By using a deterministic set of mapping adjustment rules, every node in the system may take responsibility for its role in the re-mastering operations without any unnecessary coordination messaging with other nodes.

For the purpose of explanation, in the following descriptions it shall be assumed that it is desirable for all nodes that exist in a system to participate equally in mastering resources. However, the bucket assignment techniques may be adjusted accordingly to accommodate systems in which less than all of the nodes participate and/or where nodes participate at different levels (e.g. a system in which it is desirable for one node to master half the number of resources that are mastered at another node).

The Equal Bucket Approach

According to the equal bucket approach, every node in the system is sent a message that indicates the number of nodes that belong in the system after an epoch change. Each node is aware of the total number of buckets produced by the hash function, and therefore is able to calculate how many buckets every node must have for the buckets to be distributed evenly among the existing nodes (the "target bucket count").

The nodes that exist in the system after an epoch change fall into one of two categories: nodes whose currently-assigned ranges cover more than the target bucket count number of buckets ("surplus nodes"), and nodes whose currently-assigned ranges cover less than the target bucket count number of buckets ("deficit nodes"). According to the equal bucket approach, the surplus nodes reduce their ranges until their ranges only cover the target bucket count. The deficit nodes, on the other hand, increase their ranges (or are assigned additional ranges) to cover the buckets that were left "stranded" by the range reductions experienced by the surplus nodes. These range increases are distributed among the deficit nodes in way that leaves the deficit nodes with ranges that cover the target bucket count number of buckets.

For example, FIG. 4 shows the system of FIG. 3 after an epoch change has occurred. During that epoch change, a third node 402 was added to a two node system. Using the equal bucket approach, the target number of buckets after the illustrated system change is 1000/3=333.3. Initially after the epoch change, the range assigned to node 306 covers 500 resources, the range assigned to node 308 covers 500 resources, and the range assigned to node 402 covers no resources (no range has yet been assigned to node 402). Consequently, nodes 306 and 308 are surplus nodes, and node 402 is a deficit node.

Surplus nodes 306 and 308 decrease the ranges assigned to them so that their coverage is reduced to the target number of buckets (333). In the illustrated example, the range assigned to node 306 is reduced from 1–500 to 1–333, and the range assigned to node 308 is reduced from 501–1000 to 501–833. After the surplus nodes undergo this range reduction, the buckets that belong to ranges 334–500 and 834–1000 are no longer assigned to any bucket, and are therefore belong to a "stranded bucket pool".

The deficit nodes are assigned ranges that cover buckets that belong to the stranded bucket pool, thereby increasing their number of assigned buckets to the target number of buckets. In the present example, the sole deficit node 402 is assigned all of the ranges that belong to the stranded bucket pool (in this case, range 334–500 and range 834–1000). In response to the post-epoch-change bucket range reassignments, the bucket-range-to-node mapping information 318 is revised. The bucket-range-to-node mapping information 318 illustrated in FIG. 4 reflects the bucket range assignments after the ranges have been adjusted according to the equal bucket approach.

According to one embodiment, surplus nodes select ranges to release into the stranded bucket pool in a way that reduces the total number of range assignments. For example, at the time node 308 is to release buckets into the stranded bucket pool, node 306 has already released range 224–500 into the stranded bucket pool. Rather than releasing range 834–1000 into the stranded bucket pool, node 308 may select a range that is contiguous with the range already in the stranded bucket pool. In this example, node 308 may decide to release range 500–666. After releasing range 500–666, node 308 is left with range 667–1000, and the stranded bucket pool contains a single range 334–666.

In the present example, the single range contained in the stranded bucket pool may simply be assigned to deficit node 402. However, when a deficit node already has assigned to it one or more bucket ranges, the deficit node selects ranges from the stranded bucket pool that are contiguous with its currently assigned ranges, when it is possible to do so. For example, assume that node 402 is removed from the system. This results in an epoch change where the number of nodes is reduced from three back to two. Assuming that node 402 had been assigned the range 334–666, this range would be placed in the stranded bucket pool. The remaining nodes 306 and 308 would both be deficit nodes, since their current ranges only cover 333 buckets, and the new target bucket count would be 1000/2=500.

To increase its coverage to the target bucket count, node 306 removes the range 334–500 from the stranded bucket pool. This ranges is selected because it is contiguous with the range 1–333 currently assigned to node 306. Node 308 then removes the remaining range 501–666 from the stranded bucket pool. As a result of these range adjustments, the ranges associated with nodes 306 and 308 are once again, respectively, 1–500 and 501–1000.

The Node Vector Approach

An alternative to the equal bucket approach to bucket reassignment is referred to herein as the node vector approach. According to the node vector approach, an M-length vector is maintained, where M is the number of hash buckets of the resource-to-bucket hash function. Each entry in the node vector corresponds to a hash bucket and stores a node identifier. The node identified by the node identifier of a vector entry serves as the master of all resources whose names hash to the bucket associated with that vector entry. For example, assume the vector is named MASTER( ). If the identifier for node N1 is stored in MASTER( ), then all resources that hash to bucket 5 are mastered on node N1.

Initially, the node vector MASTER( ) is populated by assigning an approximately equal number of entries to each of the nodes. A simple way to perform this assignment is to store, beginning at the first vector entry, X node identifiers for each node, where X is equal to the number of hash buckets divided by the number of nodes. For example, if there are 100 hash buckets and 10 nodes, then the identifier for the first node will be stored in vector entries 1–10, the identifier for the second node will be stored in vector entries 11–20, etc.

After an epoch change, a second node vector NEWMASTER( ) is created. In addition, a target bucket count is calculated as described above based on the number of nodes in the post-epoch-change system. The NEWMASTER( ) vector is initially populated by copying into NEWMASTER( ) the identifier stored in each entry in the MASTER( ) vector that satisfies the following two conditions: (1) the identifier is for a node that is still in the system, and (2) the number of entries already assigned to the node is less than the target bucket count. After this initial population of NEWMASTER( ), all resources that hash to a value i such that MASTER(i)=NEWMASTER(i) may be made immediately available. The remaining unassigned entries in NEWMASTER( ) are then assigned node identifiers in a manner that attempts to store a total of X identifiers for each node, where X is the target bucket count.

After all entries in NEWMASTER( ) have been populated, all resources that hash to a value i such that MASTER(i)< >NEWMASTER(i) have to be remastered. During this remastering operation, each node Na transfers to another node Nb the master resource objects of the resources that hash to a bucket i where MASTER(i)=Na and NEWMASTER(i)=Nb. In addition, each node Na rebuilds the master resource objects for resources that hash to a bucket i where MASTER(i)=the identifier of a node that was lost during the epoch change and NEWMASTER(i)=Na.

Delayed Load Balancing

In the ideal case, the load associated with mastering resources is evenly distributed among the nodes in the post-reconfiguration system. Further, only the minimum number of resources required to evenly distribute the load are moved during the reconfiguration. However, even when remastering the minimum number of resources required to evenly balance the load, the reconfiguration process may involve a significant amount of overhead and render portions of the system unavailable for an unacceptably long period of time.

According to one aspect of the invention, the duration of the reconfiguration operation is reduced by initially remastering less than all of the resources that need to be remastered to achieve the desired load balancing. Thus, the initial reconfiguration that occurs after an epoch change does not evenly balance the load. Instead, after the initial reconfiguration has taken place and the system is generally made available, buckets are gradually reassigned from surplus nodes to deficit nodes, thereby "migrating" the resources to achieve, over time, a more evenly distributed load balance.

There are two general types of remastering operations: lost-master remastering and transferred-master remastering. Lost-master remastering is required for resources whose pre-epoch-change masters were removed from the system during the epoch change. Lost-master remastering of a resource generally involves rebuilding the master resource object for the resource at an existing node.

Transferred-master remastering, on the other hand, is performed for resources whose pre-epoch-change masters continue to exist in the system after the epoch change.

Transferred-master remastering does not require the master resource object of a resource to be rebuilt because the master resource object was not lost during the epoch change.

According to one embodiment, only those resources that must undergo lost-master remastering are initially remastered after an epoch change. Specifically, the bucket-to-node hash function is revised in response to an epoch change to initially reassign only the buckets that mapped to nodes that were lost during the epoch change. Preferably, the bucket-to-node hash function is revised in a way that maps these buckets to the post-epoch-change nodes that currently have the lowest mastering loads. The nodes to which these buckets are reassigned will typically include any nodes that were newly added to the system during the epoch change.

After all of the necessary lost-master remastering is performed, the system is made available to users. The gradual migration of additional resources from surplus nodes to deficit nodes to achieve a more balanced load distribution is performed after the system has been made available. Further, the transferred-master remastering operations that are performed after the initial post-epoch-change reconfiguration are performed in a manner that does not again render the system unavailable.

Figure 5:
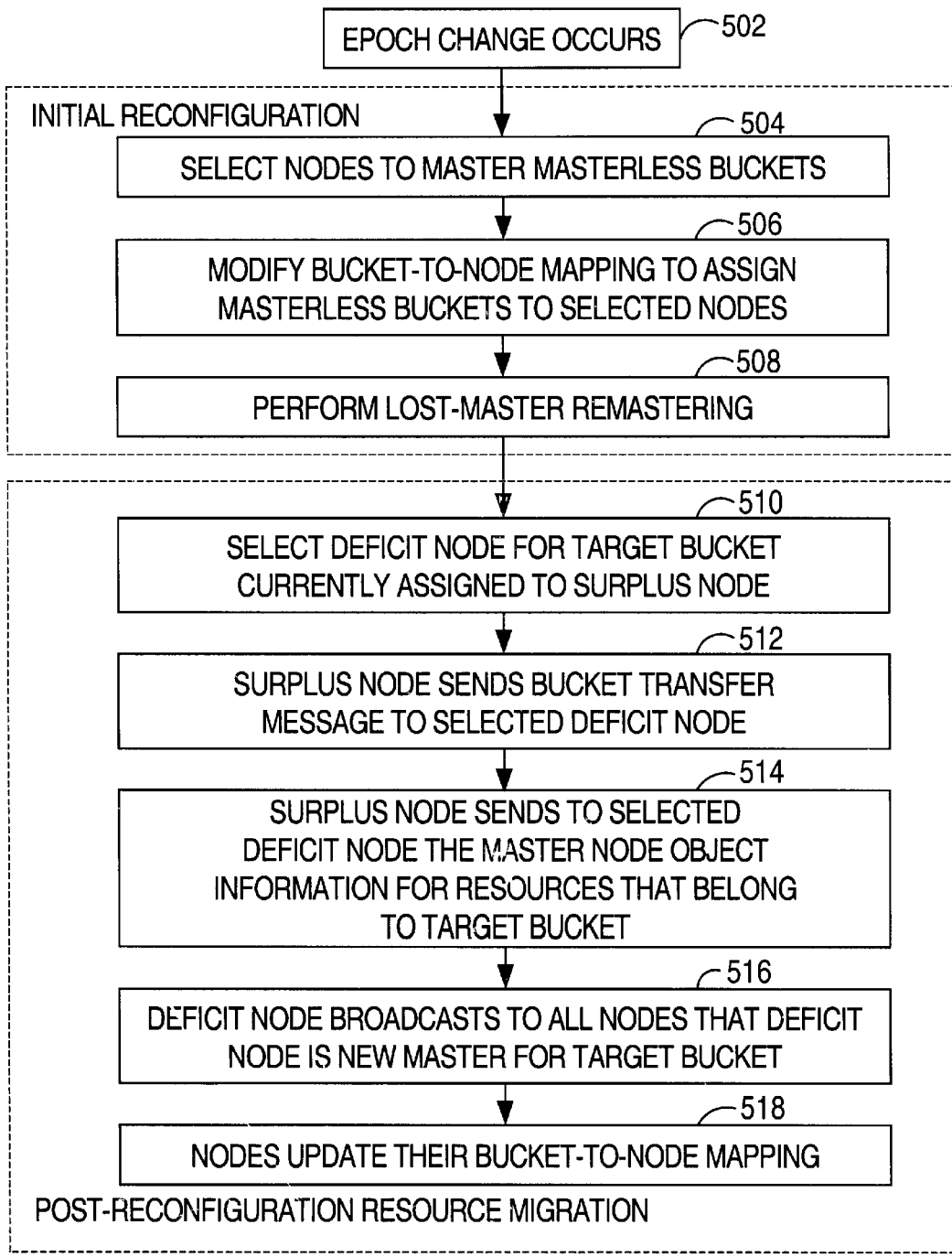
FIG. 5 is a flowchart illustrating steps for reconfiguring a system after an epoch change according to an embodiment of the invention.

Referring to FIG. 5, it is a flowchart illustrating steps for remastering resources after an epoch change according to an embodiment of the invention. At step 502, the epoch change occurs. At step 504, deficit nodes are selected master the buckets that were assigned to nodes that were lost in the epoch change ("masterless buckets"). According to one embodiment, the one or more nodes of the post-epoch-change system that have the least number of assigned buckets are selected. Typically, the selected buckets would include any nodes that were added to the system during the epoch change.

At step 506, the bucket-to-node mapping is revised to assign the masterless buckets to the nodes that were selected in step 504. At step 508, lost-master remastering is performed. Specifically, the master resource objects for the resources that have names that hash to the remapped buckets are rebuilt on their new master nodes. For example, if the name of resource R1 hashes to a bucket B1 that has been remapped to a node N1, then the master resource object for R1 is rebuilt on N1.

Steps 504, 506 and 508 constitute the initial reconfiguration that is performed after an epoch change according to an embodiment of the invention. Steps 510–518 illustrate the steps involved in post-reconfiguration resource migration, performed after the initial reconfiguration in order to more evenly load balance between the nodes that exist after the epoch change. Many surplus nodes may concurrently participate in the post-reconfiguration resource migration. Further, such post-reconfiguration migration may take place gradually, and need not occur or begin immediately after the initial reconfiguration.

At step 510, a surplus node selects a deficit node to which one or more of the buckets that currently belong to the surplus node are to be assigned. For the purpose of explanation, it shall be assumed that a single "target" bucket is to be reassigned to the selected deficit node. At step 512, the surplus nodes sends a bucket transfer message to the selected deficit node to inform the deficit node that the target bucket is to be reassigned to the deficit node. At step 514, the surplus node sends to the selected deficit node the master node object information for resources that belong to the target bucket.

At step 516, the deficit node broadcasts to the other nodes in the system a message that indicates that the deficit bucket is the new master for the target bucket. At step 518, the nodes respond by updating their bucket-to-node mapping to indicate that the target bucket has been assigned to the deficit node that sent the message.

Significantly, the system can remain available while post-reconfiguration resource migration is taking place. According to one embodiment, even processes that require access to resources that are undergoing migration may continue to execute. For example, assume that a process on a node N1 requires a resource that is being migrated from a node N2 to a node N3. The resource name will hash to a bucket that, according to the bucket-to-node mapping at N3 is still assigned to N2. Consequently, the process will send an access request to N2. If N2 has not yet transferred the master resource object for the resource in question, N2 may service the request as normal. If N2 has already transferred the master resource object to N3, then N2 forwards the request to N3. Even if the master resource object for the resource has not yet arrived at N3, the request will arrive at N3 after the master resource object because data from N2 arrives at N3 in the same order that it is sent from N2. Once both the master resource object and the request arrive at N3, N3 may then service the request.

According to one aspect of the invention, the node that is transferring a resource to another node (N2 in the example given above) may continue to maintain its own version of the master resource objects that it is transferring. The version of the master resource object maintained at the transferring node operates as a backup. Consequently, if the node to which a master resource object is being transferred fails, the backup master resource object may be used to control access to the resource. Until the receiving node broadcasts the fact that it is the new master, the overhead associated with maintaining the backup master resource object on the transferring node is reduced by the fact that all access requests arrive at (and are forwarded by) the transferring node anyway. After the receiving node broadcasts the fact that it is the new master, the transferring node may either cease to maintain the backup master resource object, or continue to maintain the master resource object. If the transferring node continues to maintain the backup version of the master resource object, it does so by incurring the added overhead associated with the new master node forwarding access requests to the old master node for the purposes of accurately maintaining the backup.

According to one embodiment, if an epoch change occurs while the master resource objects associated with a bucket are being migrated between nodes, the bucket is treated as a masterless bucket. Consequently, the bucket is reassigned a master, and the master resource objects are rebuilt, during the initial reconfiguration after the epoch change.

Planned Shutdown

According to one embodiment of the invention, the steps 510–518 shown in FIG. 5 are performed prior to an epoch change when it is known that certain nodes are going to be shut down during the epoch change. For example, if it is known that node N2 is going to be shut down, node N2 may transfer the master resource objects associated with buckets currently assigned to N2 to one or more other nodes that are not going to be shut down.

During this process, if N2 receives an access request associated with a resource whose master resource object has already been transferred, then N2 forwards the request to the appropriate node. After N2 has transferred the master resource objects associated with all of the buckets previously assigned to N2, N2 waits for all of the receiving nodes to broadcast messages indicating their new buckets assignments. After all broadcast messages have been sent, N2 will no longer be assigned any buckets, and N2 may shut down. The shutdown of N2 under these conditions will not incur the overhead associated with lost-master remastering.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for mastering resources to nodes in a multiple node system, the method comprising the steps of:

for each resource in a set of resources, selecting a node to master the resource by
        mapping the resource to a specific hash bucket using a first hash function;
        mapping the specific hash bucket to a specific node using a second hash function;
        selecting said specific node to be master of said resource; and
    responding to an epoch change by modifying said second hash function without modifying said first hash function.

2. The method of claim 1 wherein:

prior to the epoch change, a first number of nodes are used to master resources from said set of resources;
    after the epoch change, a second number of nodes are used to master resources from said set of resources;
    the method includes the step of using said first hash function to hash resources to a certain number of buckets, wherein said certain number of buckets is greater than both said first number and said second number.

3. The method of claim 1 wherein:

said second hash function is implemented using bucket-to-node mapping information; and
    the step of modifying said second hash function comprises modifying one or more bucket-to-node mappings within said bucket-to-node mapping information.

4. The method of claim 3 wherein:

each node of a plurality of nodes maintains a local copy of the bucket-to-node mapping information; and
    the step of modifying one or more bucket-to-node mappings within said bucket-to-node mapping information is performed in parallel at each of said plurality of nodes.

5. The method of claim 4 wherein the step of modifying said one or more bucket-to-node mappings is performed by applying a set of rules that generate a deterministic result based on the bucket-to-node mapping prior to the epoch change and how many nodes are available to master resources after the epoch change.

6. The method of claim 3 wherein the step of modifying one or more bucket-to-node mappings includes the steps of:

determining a target bucket count based on how many of hash buckets are associated with said first hash function and how many nodes are available to master resources after the epoch change;
    if a particular node is available for mastering resources after the epoch change, then after the epoch change performing the steps of
        if more than the target bucket count of buckets were mapped to the particular node before the epoch change, then revising the bucket-to-node information to map one or more buckets that were mapped to the particular node before the epoch change to a different node;
        if less than the target bucket count of buckets were mapped to the particular node before the epoch change, then revising the bucket-to-node information to map one or more buckets that were mapped to a different node before the epoch change to the particular node.

7. The method of claim 1 wherein the step of modifying said second hash function includes the steps of:

performing an initial reconfiguration after said epoch change, said initial reconfiguration including the step of remapping to nodes that exist after the epoch change a set of buckets that were mapped to nodes that were removed during the epoch change;
    after performing said initial reconfiguration, performing the steps of
        making the multiple node system generally available; and
        while the multiple node system is generally available, migrating to a deficit node one or more buckets currently mapped to a surplus node.

8. The method of claim 7 wherein the step of migrating includes the steps of:

the surplus node sending to the deficit node resource information required for mastering resources that map to said one or more buckets; and
    after sending said resource information, the surplus node forwarding to said deficit node requests received by said surplus node that are related to said resources that map to said one or more buckets.

9. The method of claim 8 further comprising the steps of:

the deficit node broadcasting to a set of nodes a message indicating that said deficit node is master of said resources that map to said one or more buckets; and
    the nodes in said set of nodes responding to said message by modifying said second hash function to map said one or more buckets to said deficit node.

10. A method for remastering resources that are currently mastered on a node that is going to be removed from a multiple node system during an epoch change, the method comprising the steps of:

the node sending to another node resource information required for mastering said resources; and
    after sending said resource information, the node forwarding to said other node requests received by said node that are related to said resources.

11. The method of claim 10 wherein:

the resources map to a hash bucket associated with a first hash function;
    the hash bucket maps to said node based on a second hash function;
    after receiving said resource information, said other node sends a message that said other node is master of said resources; and
    in response to said message, the second hash function is modified to map said hash bucket to said other node.

12. The method of claim 11 wherein:

the other node broadcasts said message to a plurality of nodes; and
    the second hash function is modified by causing each node of said plurality of nodes to modify bucket-to-node mapping information maintained at said each node.

13. A computer-readable medium carrying sequences of instructions for mastering resources to nodes in a multiple node system, the sequences of instructions including instructions for performing the steps of:

for each resource in a set of resources, selecting a node to master the resource by
mapping the resource to a specific hash bucket using a first hash function;
mapping the specific hash bucket to a specific node using a second hash function;
selecting said specific node to be master of said resource; and responding to an epoch change by modifying said second hash function without modifying said first hash function.

14. The computer-readable medium of claim 13 wherein:

prior to the epoch change, a first number of nodes are used to master resources from said set of resources;

after the epoch change, a second number of nodes are used to master resources from said set of resources;

the computer-readable medium includes instructions for performing the step of using said first hash function to hash resources to a certain number of buckets, wherein said certain number of buckets is greater than both said first number and said second number.

15. The computer-readable medium of claim 13 wherein:

said second hash function is implemented using bucket-to-node mapping information; and the step of modifying said second hash function comprises modifying one or more bucket-to-node mappings within said bucket-to-node mapping information.

16. The computer-readable medium of claim 15 wherein:

each node of a plurality of nodes maintains a local copy of the bucket-to-node mapping information; and the step of modifying one or more bucket-to-node mappings within said bucket-to-node mapping information is performed in parallel at each of said plurality of nodes.

17. The computer-readable medium of claim 16 wherein the step of modifying said one or more bucket-to-node mappings is performed by applying a set of rules that generate a deterministic result based on the bucket-to-node mapping prior to the epoch change and how many nodes are available to master resources after the epoch change.

18. The computer-readable medium of claim 15 wherein the step of modifying one or more bucket-to-node mappings includes the steps of:

determining a target bucket count based on how many of hash buckets are associated with said first hash function and how many nodes are available to master resources after the epoch change;

if a particular node is available for mastering resources after the epoch change, then after the epoch change performing the steps of
if more than the target bucket count of buckets were mapped to the particular node before the epoch change, then revising the bucket-to-node information to map one or more buckets that were mapped to the particular node before the epoch change to a different node;
if less than the target bucket count of buckets were mapped to the particular node before the epoch change, then revising the bucket-to-node information to map one or more buckets that were mapped to a different node before the epoch change to the particular node.

19. The computer-readable medium of claim 13 wherein the step of modifying said second hash function includes the steps of:

performing an initial reconfiguration after said epoch change, said initial reconfiguration including the step of remapping to nodes that exist after the epoch change a set of buckets that were mapped to nodes that were removed during the epoch change;

after performing said initial reconfiguration, performing the steps of
making the multiple node system generally available; and
while the multiple node system is generally available, migrating to a deficit node one or more buckets currently mapped to a surplus node.

20. The computer-readable medium of claim 19 wherein the step of migrating includes the steps of:

the surplus node sending to the deficit node resource information required for mastering resources that map to said one or more buckets; and after sending said resource information, the surplus node forwarding to said deficit node requests received by said surplus node that are related to said resources that map to said one or more buckets.

21. The computer-readable medium of claim 20 further comprising instructions for performing the steps of:

the deficit node broadcasting to a set of nodes a message indicating that said deficit node is master of said resources that map to said one or more buckets; and the nodes in said set of nodes responding to said message by modifying said second hash function to map said one or more buckets to said deficit node.

22. A computer-readable medium carrying sequences for remastering resources that are currently mastered on a node that is going to be removed from a multiple node system during an epoch change, the sequences of instructions comprising instructions for performing the steps of:

the node sending to another node resource information required for mastering said resources; and after sending said resource information, the node forwarding to said other node requests received by said node that are related to said resources.

23. The computer-readable medium of claim 22 wherein:

the resources map to a hash bucket associated with a first hash function;

the hash bucket maps to said node based on a second hash function;

after receiving said resource information, said other node sends a message that said other node is master of said resources; and in response to said message, the second hash function is modified to map said hash bucket to said other node.

24. The computer-readable medium of claim 23 wherein:

the other node broadcasts said message to a plurality of nodes; and the second hash function is modified by causing each node of said plurality of nodes to modify bucket-to-node mapping information maintained at said each node.

* * * * *